United States Patent [19]
Koziol

[11] 3,753,396
[45] Aug. 21, 1973

[54] COOKING DEVICE
[75] Inventor: Walter Koziol, Russell, Ill.
[73] Assignee: Beatrice Foods Co., Chicago, Ill.
[22] Filed: Dec. 31, 1970
[21] Appl. No.: 103,309

Related U.S. Application Data
[63] Continuation of Ser. No. 800,634, Feb. 19, 1969, abandoned.

[52] U.S. Cl. ................................................. 99/450
[51] Int. Cl. ............................................. A47j 37/04
[58] Field of Search ...................... 99/450, 339, 340, 99/380, 376, 391, 393, 395, 397, 398, 402, 409, 410, 421, 443, 444, 445, 448; 15/144 A; 126/9, 11, 29, 30, 25

[56] References Cited
UNITED STATES PATENTS

| | | | |
|---|---|---|---|
| 320,436 | 6/1885 | Hock | 15/144 A UX |
| 769,745 | 9/1904 | Hendrickson | 99/397 |
| 1,034,581 | 8/1912 | Burky | 99/380 X |
| 1,091,877 | 3/1914 | Collis | 99/450 UX |
| 1,349,494 | 8/1920 | Chaffee | 99/380 X |
| 1,490,177 | 4/1924 | Matson | 99/376 |
| 2,722,704 | 11/1955 | Warden | 15/144 A X |
| 3,027,887 | 4/1962 | Krohncke | 126/25 R |
| 3,070,084 | 12/1962 | Gier et al. | 126/25 R |
| 3,298,361 | 1/1967 | Clark | 126/25 R |
| 3,559,565 | 2/1971 | Getz | 99/340 |

Primary Examiner—William I. Price
Assistant Examiner—Arthur O. Henderson
Attorney—Neil E. Hamilton

[57] ABSTRACT

A barbecue grill type cooking apparatus is constructed with a grid member which can be both pivoted and rotated on a base member while simultaneously retained on the base member. The pivoting, rotating and retaining is effected by a unitary means which preferably is a ball and socket arrangement.

10 Claims, 11 Drawing Figures

Patented Aug. 21, 1973 3,753,396

Inventor
WALTER KOZIOL
By Neil E. Hamilton
Attorney

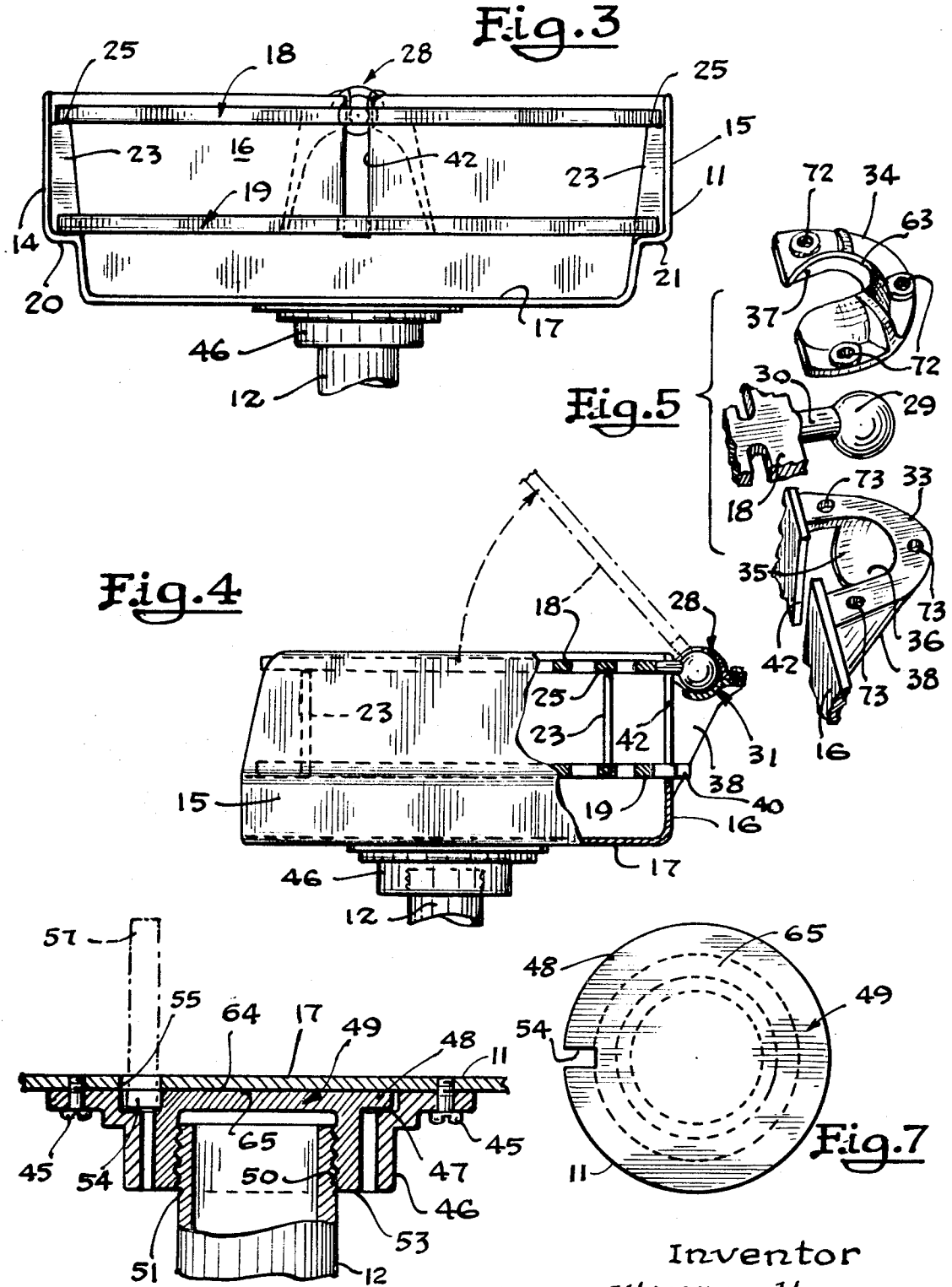

Patented Aug. 21, 1973  3,753,396
3 Sheets-Sheet 3
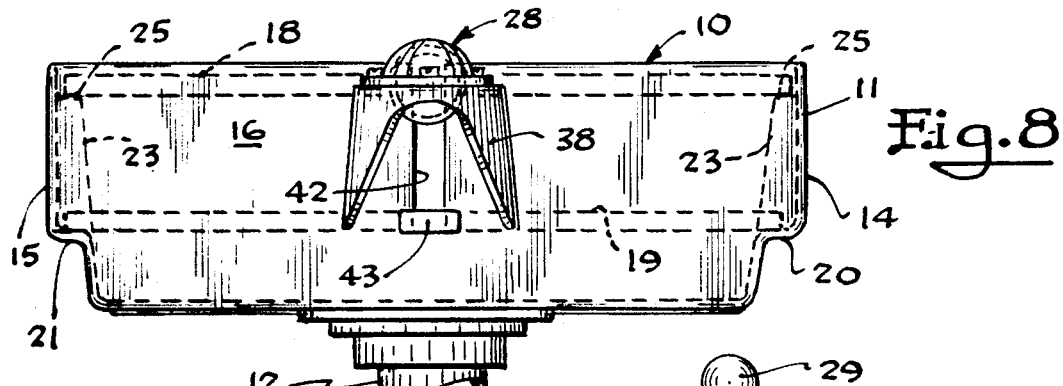
Fig.8
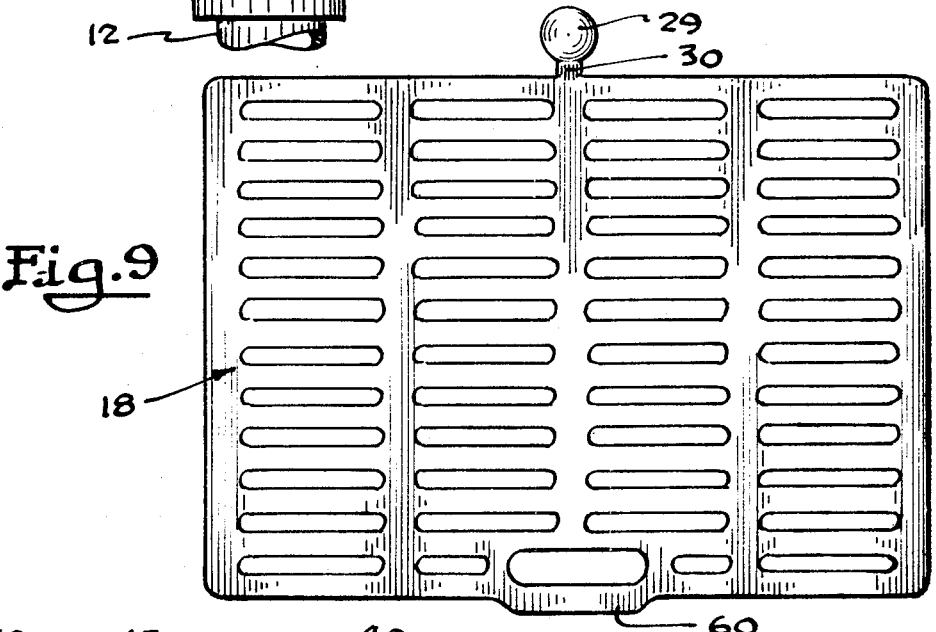
Fig.9
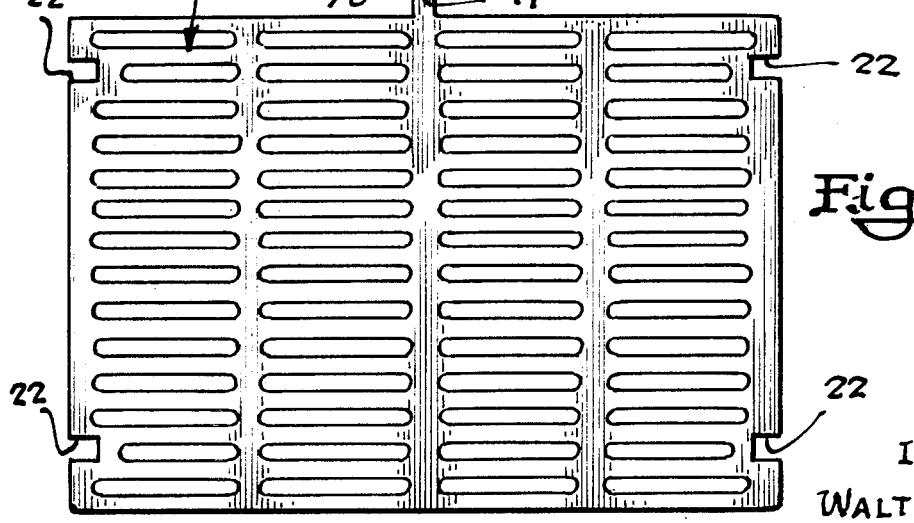
Fig.10
Inventor
WALTER KOZIOL
By Neil E. Hamilton
Attorney

3,753,396

COOKING DEVICE

This is a continuation of application Ser. No. 800,634, filed Feb. 19, 1969, now abandoned.

BACKGROUND OF THE INVENTION

This invention relates to a pivotal and rotatable grid member for a barbecue unit and more particularly, to a grid member which is retained on the base portion of a barbecue unit by the same means which provide pivoting and retention.

Pivotal and/or rotatable grids for barbecue grills are described in U.S. Pat. Nos. 769,745; 3,070,084 and 3,392,664. The latter two patents show a pivotal grid and U.S. Pat. No. 769,745 illustrates a grid which is pivoted upwardly and can be rotated so as to expose either side of the grid to a fire. However, the prior art nowhere discloses a grid which is both pivotal and rotatable yet is also secured to a barbecue unit. It will be recognized that it is an important aspect of a barbecue unit to have a grid which will permit exposure of at least one flat surface to a fire so as to purge or clean the surface before cooking on it. It is just as important to have a grid in a barbecue grill which is not only pivotal but which is retained on a barbecue grill unit in a manner such that it cannot be easily removed and stolen yet can be moved out of the way for easy cleaning of the unit. Further, the rotation and retention should be effected in a unit at a minimum of cost by employing a few parts and be inexpensive in its fabrication.

It is therefore an object of the present invention to provide a novel construction for a cooking device. It is another object of the present invention to provide a grid member in a barbecue unit which can be both pivoted upwardly and rotated and is simultaneously retained on the unit. It is still another object of the present invention to provide a barbecue grill unit which is easily cleaned yet is durable in construction. It is a further object of the invention to provide a combined pivotal, rotatable and retentive grid member for a barbecue unit which is fabricated without special methods and employes a few parts.

SUMMARY OF THE INVENTION

The foregoing objects are accomplished and the shortcomings of the prior art are overcome by the present cooking device which is comprised of a base portion with a grid member movably but retentively disposed above a heat source in the base portion. Means are carried by the base portion and the grid to allow a pivoting of the grid upwardly from the heat source and also to permit a rotating of the grid. The pivoting and rotating means include means to retain the grid on the base portion and the combined rotating, pivoting and retention means are disposed at a single point on said grid.

BRIEF DESCRIPTION OF DRAWING

A better understanding of the present grid arrangement will be accomplished by reference to the drawing wherein:

FIG. 3 is a front view in elevation of the unit shown in FIG. 1.

FIG. 4 is a partial side elevational view of the barbecue illustrated in FIG. 1 with a portion broken away showing an upward-downward pivoting of the grid member.

FIG. 5 is an exploded view of the ball and socket means for pivoting, rotating and retaining the grid member shown in FIGS. 1, 2, 3 and 4.

FIG. 6 is a partial, vertical section view illustrating the rotation of the base of the barbecue unit shown in FIGS. 1, 3 and 4 on a support post.

FIG. 7 is a horizontal view illustrating the removable collar.

FIG. 8 is a back view in elevation of the FIG. 1 unit.

FIG. 9 is a top view of the upper grid member shown in FIG. 1.

FIG. 10 is a view similar to FIG. 9 but of the lower grate member.

DESCRIPTION OF THE PREFERRED EMBODIMENT

Figure 1:
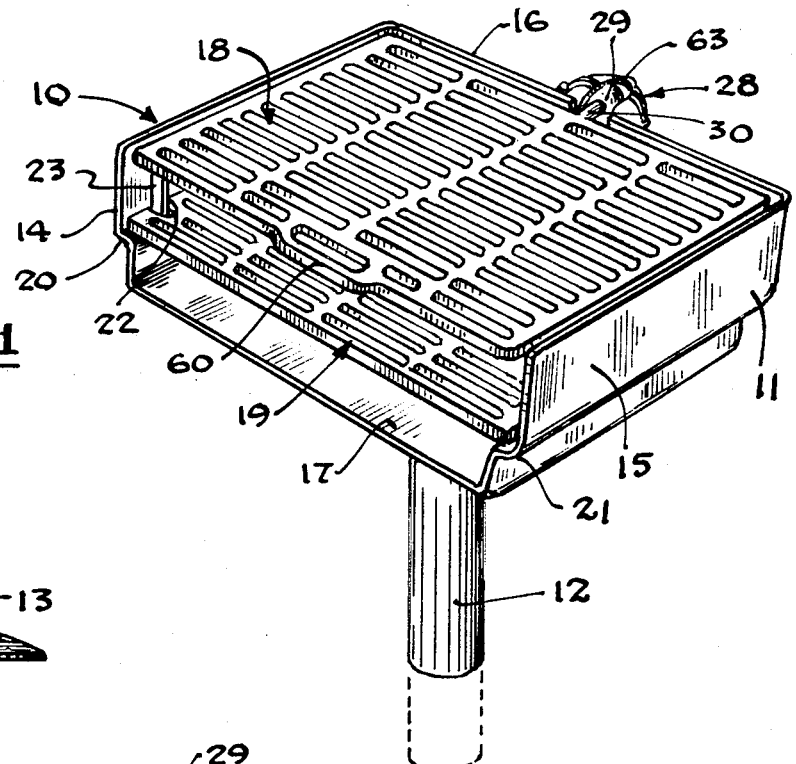
FIG. 1 is a perspective view of a barbecue unit illustrating the novel grid arrangement of the present invention.
Figure 1A:
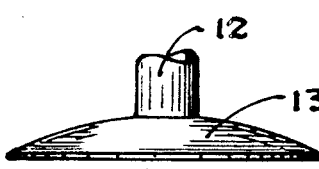
FIG. 1A is a side elevational view of a base member for the unit shown in FIG. 1.
Figure 2:
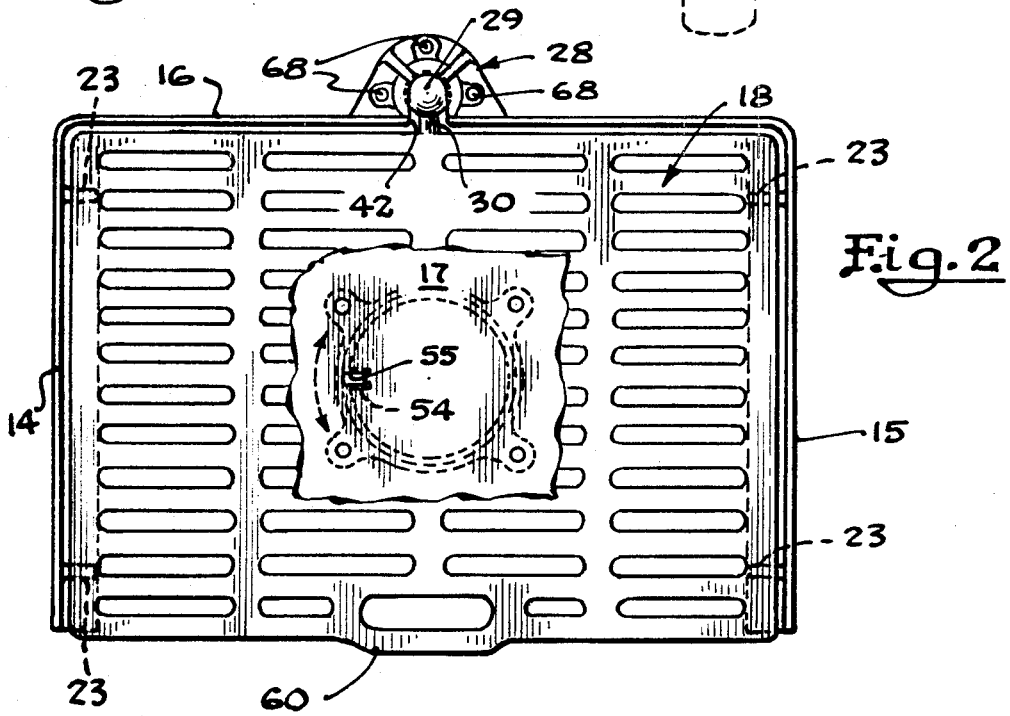
FIG. 2 is a top view of the barbecue unit shown in FIG. 1.

Proceeding to a detailed description of the present invention, the cooking device generally 10 is comprised of a base portion 11 supported by a pole 12 with footer 13. Base portion 11 is formed from two opposing side walls 14 and 15, a rear wall 16 and a bottom wall 17. Accommodated within the confines of base portion 11 are an upper grid member 18 and a lower grate member 19, both disposed above a source of heat such as charcoal (not shown) to be placed on the upper surface of grate member 19.

As best shown in FIGS. 1 and 3, grate 19 rests horizontally along opposing sides on ledges 20 and 21 formed in side wall 14 and 15, respectively. U-shaped slots 22 are disposed in grate 19 to accommodate two pairs of oppositely positioned struts 23 extending upwardly from ledges 20 and 21, terminating short of the upper surfaces of walls 14 and 15. Grid member 18 is horizontally supported by the upper surfaces 25 of struts 23.

Referring specifically to FIGS. 4, 5 and 8, the combined pivoting, rotating and retention means generally 28 is formed from a ball 29 secured to grid 18 by neck portion 30. Ball 29 pivots and rotates in a two-part socket member generally 31 formed from a lower cut portion 33 and an upper cap 34, both having approximately the same radius of curvature as the ball. An opening 35 is provided in a concave cup 36 as well as along adjacent portions of back wall 16 for reasons to be explained later. Another opening 37 is disposed in cap 34 to permit neck 30 to pivot upwardly therein. Cup portion 33 with cup 36 is supported on the outside of rear wall 16 by a generally U-shaped support 38 best shown in FIG. 8. Grate 19 is retained in base portion 11 by a T-shaped protruding engaging member 40 with the leg 41 of the T disposed in slot 42 and the cross-arm 43 disposed to the outside of back wall 16. It will be noted that slot 42 extends the entire distance from the top of base portion 11 through lower cup portion 33 and down to a point approximately even with a horizontal plane across ledges 20 and 21.

Referring specifically to FIGS. 6 and 7, it will be seen that base portion 11 is rotatably attached to post 12 by bottom wall 17 having secured thereto by screws 45 a collar portion 46 having an annular shoulder 47 for rotatable engagement with a flange 48 of T-shaped cap 49. Internal threads 50 are provided in cap 49 for engaging external threads 51 on post 12 between shoulder 47 and the underside 53 of cap 49. A slot 54 is formed in the flange 48 of cap 49 extending into a section of the main body thereof and another slot 55 is provided in bottom wall 17 so that a key 57 can be inserted through bottom wall 17 and into slot 54 to turn cap 49 onto or off of post 12 without removal of screws 45 which threadably engage base wall 17.

OPERATION

A better understanding of the advantages of the cooking device 10 will be had by a description of its operation and initially referring to FIGs. 1 and 3. Grid member 18 will be raised by grasping handle 60 and lifting or pivoting grid 18 upwardly and toward back wall 16 until neck engages the end wall portion 63 of socket cap 34. At this position grid 18 will be positioned slightly past vertical and thus will be self-sustained and not fall back. Charcoal or wood is then placed on grate 19 with the open end of base portion 11 opposite wall 16 faced in the direction of the wind. This is afforded by bottom surface 64 of bottom wall 17 rotating over the upper surface 65 of T-shaped cap 49. With a fire started, grid is lowered onto struts 23 and left in this resting position until the under surface of grid 18 is sterilized and purged by the fire. Grid member 18 is again raised upwardly by pivoting ball 29 in socket member 31 and when in a position so that the sides of grid 18 will clear the upper edges of walls 14, 15 and 16, the grid 18 is rotated 180° and grid 18 is lowered onto struts 23 to place the previous sterilized side up for cooking.

It will be noted that when grid 18 was pivoted and rotated by ball and socket means 28, it was also retained on base 11 as ball 29 is held captive between socket cap 34 and cup 36. Cap screws 68 provide the necessary attachment. Grate 19 is also held captive by ball and socket means 28 as neither the leg 41 nor the cross-arm 43 of T-member 40 on grate 19 can move out of the top of slot 42 because of the presence of either neck 30 or ball 29 in slot 42. Neither can grate 19 be removed by pulling away from rear wall 16 because of contact by the inner surface 70 of crossarm 43 contacting the outer surface of wall 16.

ASSEMBLY

The assembly of grate 19 and grid 18 onto base 11 is a simple matter. Grate 19 is horizontally orientated at the top of and within the confines of base 11 with leg 41 of T-member 40 placed over slot 42, cross-arm 43 of the T placed over opening 35 in cup 36 and slots 22 placed over struts 23. In this position, grate 19 is allowed to drop until it rests on ledges 20 and 21. Next, ball 29 of grid 18 is placed in cup 36 with neck 30 in slot 42 and the grid resting on the upper surfaces of struts 23. Cap 34 is placed over ball 29 and onto mating cup 33 and screws 68 inserted in the three pairs of matching holes 72 and 73 with those of 73 being threaded. To place base member 11 onto post 12, both grid and grate 18 and 19, respectively, are raised upwardly a short distance to provide access for key 57 through slot 55 in base wall 17 and into slot 54 of T-shaped threaded cap 49 which is orientated with slot 55. With cap 49 thus held against rotation with respect to base wall 17, cap 49 is threaded onto post 12 and the entire base 11 with cap 49 turned as a single unit to screw cap 49 onto post 12. With grid 18 and grate 19 returned to their normal positions, slot 55 in base wall 17 is hardly noticeable and a removable plug can be placed therein. This serves to keep ashes from accumulating between collar 46 and cap 49. To remove the grid and grate with the base member 11 from post 12, the previously indicated procedure is merely repeated with the turning of base member 11 reversed.

If desired and in order to assure a tamper-proof cooking device, both screws 45 and 68 can be of the once-thread type or bolts and screws used with battered threads.

The preferred metal for fabricating base member 11, grid 18, grate 19 as well as ball and socket 28 is cast aluminum. However, any metal commonly employed in this art such as cast iron, steel, or alloys of any of these can be used. In the preferred embodiment 10, socket member 31 is disposed on base 11 and ball 29 is carried by grid 18. If desired, these parts could be reversed and still provide the ball and socket retentive arrangement. Cap member 34 of ball and socket 28 is fastened to cup 33 by screws 68. Alternatively, nuts and bolts could be used or cap 34 and cup 33 welded together. Struts 23 are integrally molded into base 11 but could be fastened by welding or with clips, screws or the like. Screws 45 are also indicated as the preferred means for securing collar 46 to base wall 17. However, collar 46, with T-shaped cap 49 freely movable therein, could be welded to the base wall 17 to provide a completely tamper-proof device as in the manner indicated for socket 31.

In cooking device 10, grate 19 has been illustrated for captive use with the ball and socket arrangement for grid 18. Alternatively, grate 19 could be permanently fastened into base 11 as with screws or by welding, or could be molded therein. While not preferred from a combustion standpoint, grate 19 could be eliminated entirely.

It will thus be seen that there is now provided a novel cooking device which permits the upper cooking grid to be lifted, rotated and retained by the same unitary means. The cooking unit is advantageously operative with a lower grate and provides a tamper-proof structure for the grid and the grate as well as a tamper-proof means for attachment to a post. The cooking unit is simple in design and thus can be manufactured without costly equipment. A cooking unit is provided which is sturdy in construction and can be used over a long period of time without adjustment or replacement.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A barbecue type cooking device comprising a base portion including means to confine and contain a heat source at a first level, a grid member disposed above said heat source and combined unitary rotating, pivoting and retention ball and socket means carried by said base portion and said grid to pivot said grid member upwardly from said heat source and rotate said grid member, said ball and socket means constructed and arranged with said socket secured partially around said ball in a substantially nonremovable manner to retain captively said grid member directly on said base portion in a fastened and tamperproof manner.

2. The cooking device as defined in claim 1 wherein said ball is carried by said grid member and said socket is carried by said base portion.

3. The cooking device as defined in claim 2 wherein said socket is fabricated in an upper cap and a lower cup portion and said upper cap portion is adapted to be secured to said lower cup portion with said ball inside.

4. A barbecue type cooking device comprising a base portion including means to confine and contain a heat source at a first level, said means to confine and contain a heat source including a grate member, a grid member disposed above said heat source, combined unitary rotating, pivoting and retention means carried by said base portion and said grid to pivot said grid member upwardly from said heat source and rotate said grid member, said pivoting and rotating means constructed and arranged to retain captively said grid member directly on said base portion in a fastened and tamperproof manner, and means carried by said grate member and said base portion to secure said grate member to said base portion and said rotating, pivoting and retention means serving as part of said means to secure said grate member to said base portion.

5. The cooking device as defined in claim 4 wherein said means to secure said grate member to said base portion is a ball and socket member carried by said grid member and said base portion, said socket member being carried by said base portion, and further includes a slot extending substantially in a vertical manner from said socket member into said base portion and means to secure said grate along said slot.

6. The cooking device as defined in claim 5 wherein said grate member is slidably secured along said slot by a T-shaped engaging member.

7. The cooking device as defined in claim 6 wherein said ball member includes a neck portion extending through said slot.

8. A barbecue type cooking device comprising a base portion including means to confine and contain a heat source at a first level, a grid member disposed above said heat source, combined unitary rotating, pivoting and retention means carried by said base portion and said grid to pivot said grid member upwardly from said heat source and rotate said grid member, said pivoting and rotating means constructed and arranged to retain captively said grid member directly on said base portion in a fastened and tamperproof manner, a supporting post, means to rotatably support said base portion on said post, a first portion engageable by said post and a second portion mounted for rotation over said first portion and cooperating slots in said base portion and said first portion engageable by a key for removing said base from said post.

9. The cooking device as defined in claim 8 further including strut members to support said grid in a horizontal position, a grate member, a ledge portion in said base portion to support said grate member in a horizontal position and openings in said grate member to accommodate said struts.

10. The cooking device as defined in claim 9 wherein said struts and ledge are integrally molded in said base portion.

* * * * *